(12) United States Patent
Kim et al.

(10) Patent No.: US 9,071,977 B2
(45) Date of Patent: Jun. 30, 2015

(54) METHOD AND APPARATUS FOR TRANSMITTING AND RECEIVING CHANNEL INFORMATION IN WIRELESS COMMUNICATION SYSTEM

(75) Inventors: Eunsun Kim, Anyang-si (KR); Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 13/978,197

(22) PCT Filed: Jan. 3, 2012

(86) PCT No.: PCT/KR2012/000040
§ 371 (c)(1),
(2), (4) Date: Jul. 3, 2013

(87) PCT Pub. No.: WO2012/093831
PCT Pub. Date: Jul. 12, 2012

(65) Prior Publication Data
US 2013/0281109 A1 Oct. 24, 2013

Related U.S. Application Data

(60) Provisional application No. 61/429,199, filed on Jan. 3, 2011, provisional application No. 61/432,192, filed on Jan. 12, 2011, provisional application No. 61/446,455, filed on Feb. 24, 2011, provisional application No. 61/504,714, filed on Jul. 6, 2011.

(51) Int. Cl.
*H04B 7/212* (2006.01)
*H04W 16/14* (2009.01)
*H04W 72/04* (2009.01)

(52) U.S. Cl.
CPC .............. *H04W 16/14* (2013.01); *H04W 72/04* (2013.01)

(58) Field of Classification Search
CPC ..... H04W 72/04; H04W 88/00; H04W 84/12; H04W 16/14; H04W 72/082; H04W 24/00; H04W 72/0453; H04W 88/06; H04L 29/06068; H04L 29/06; H04L 29/06095; H04Q 11/0478; H04J 3/1617
USPC ........ 455/450–455, 41.1–41.3; 370/315–320, 370/466
See application file for complete search history.

(56) References Cited

U.S. PATENT DOCUMENTS

| 5,649,048 A * | 7/1997 | Tomita et al. ................. 386/232 |
| 2010/0195667 A1* | 8/2010 | Wang et al. .................... 370/466 |

(Continued)

OTHER PUBLICATIONS

International Search Report issued in corresponding International Patent Application No. PCT/KR2012/000040 dated Sep. 3, 2013.
Written Opinion issued in corresponding International Patent Application No. PCT/KR2012/000040 dated Sep. 3, 2012.

*Primary Examiner* — Allahyar Kasraian
*Assistant Examiner* — B. M. M Hannan
(74) *Attorney, Agent, or Firm* — Morgan, Lewis & Bockius LLP

(57) ABSTRACT

The present invention relates to a method and apparatus for performing communication by obtaining available channel information through an unlicensed device in which operations are permitted within an available channel and is not used by a licensed device in a white space band, includes the steps of: transmitting a message for requesting available channel information to a database device; receiving the available channel information including first information for indicating a format of the available channel information and second information for identifying the available channel, in response to the message for requesting the available channel information; and obtaining the second information using the first information and transmitting and receiving signals within the available channel corresponding to the second information, wherein the format of the available channel information can be changed according to country.

11 Claims, 12 Drawing Sheets

(56) References Cited

U.S. PATENT DOCUMENTS

| | | | |
|---|---|---|---|
| 2010/0216480 A1* | 8/2010 | Park et al. | 455/450 |
| 2010/0255794 A1 | 10/2010 | Agnew | |
| 2010/0304678 A1* | 12/2010 | Chandra et al. | 455/62 |
| 2011/0087639 A1* | 4/2011 | Gurney | 707/690 |
| 2011/0096770 A1* | 4/2011 | Henry | 370/352 |

* cited by examiner

FIG. 6
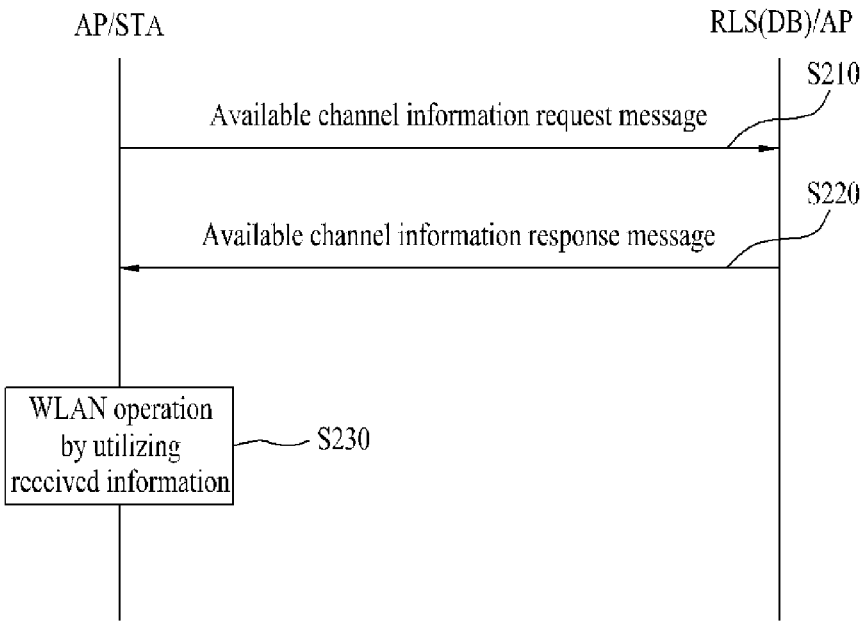
FIG. 7
| Element ID | Length | Country code | Channel map |
|---|---|---|---|
| 1 | 1 | 3 | N |
Octet
FIG. 8
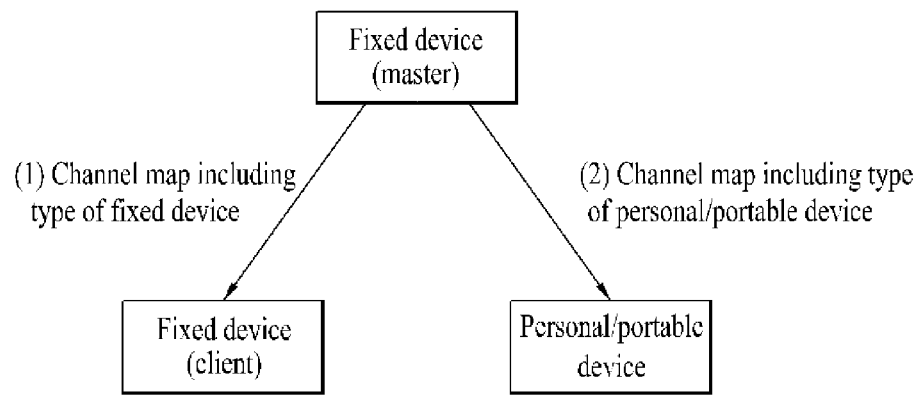

FIG. 9

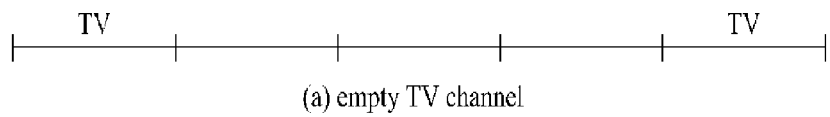

(a) empty TV channel

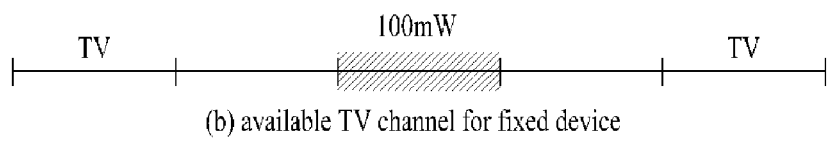

(b) available TV channel for fixed device

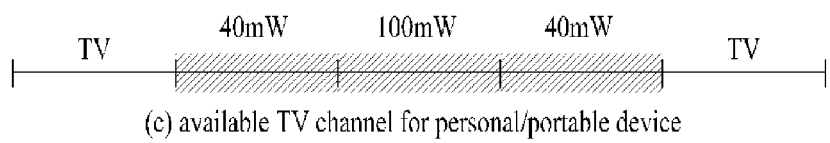

(c) available TV channel for personal/portable device

FIG. 10

These three fields are repeated according to determination by the length field

| Device type | Map ID | Channel number | Maximum power level | Validity time (optional) |
|---|---|---|---|---|
| 1 | 1 | 1 | 1 | 1 |

Octets:

FIG. 11

This field is repeated according to determination by the length field

| Category | Operation value | Requester STA address | Responder STA address | Length | Available channel number |
|---|---|---|---|---|---|
| 1 | 1 | 6 | 6 | 1 | 1 |

Octets:

FIG. 12

| Category | Operation value | Requester STA address | Responder STA address | Length | channel schedule type | Available channel number | Available start time | Available duration |
|---|---|---|---|---|---|---|---|---|
| 1 | 1 | 1 | 6 | 6 | 1 | 1 | 8 | 2 |

Octets:

These three fields are repeated according to determination by the length field

FIG. 13

| Device type | Channel number N | Maximum transmit power level in channel N | Channel number M | Maximum transmit power level in channel M | ...... | Channel number K | Maximum transmit power level in channel K | Validity time |
|---|---|---|---|---|---|---|---|---|
| 1 | 1 | 1 | 1 | 1 | | 1 | 1 | 8 |

Octets:

FIG. 14

| Device type | Channel number N | Maximum transmit power level in channel N | Validity time | ...... | Channel number K | Maximum transmit power level in channel K | Validity time |
|---|---|---|---|---|---|---|---|
| 1 | 1 | 1 | 8 | | 1 | 1 | 8 |

Octets:

FIG. 15

| | Device type | Starting Channel number (S) | Number of channels (L) | Channel bitmap | Validity time |
|---|---|---|---|---|---|
| Octets: | 1 | 1 | 1 | Variable | 8 |

FIG. 16

These four fields are repeated according to available channels

| | Device type | Start frequency | Stop frequency | Maximum permissible transmit power | Validity time |
|---|---|---|---|---|---|
| Octets: | 1 | 1 | 1 | Variable | 8 |

FIG. 17

These four fields are repeated according to available channel

| | Device type | Start frequency | Stop frequency | Maximum permissible transmit power | Validity time |
|---|---|---|---|---|---|
| Octets: | 1 | 1 | 1 | Variable | 8 |

FIG. 18

These four fields are repeated according to available channel

|  | Device type | Center frequency | Channel bandwidth | Maximum permissible transmit power | Validity time |
|---|---|---|---|---|---|
| Octets: | 1 | 1 | 1 | Variable | 8 |

FIG. 19

These three fields are repeated according to available channel

|  | Device type | Center frequency | Channel bandwidth | Maximum permissible transmit power | Validity time |
|---|---|---|---|---|---|
| Octets: | 1 | 1 | 1 | Variable | 8 |

FIG. 20

|  | Device type | Channel number N | Maximum transmit power level in channel N | Validity time |
|---|---|---|---|---|
|  | Fixed type | 3 | 100mW |  |

FIG. 21

| Device type | Channel number N | Maximum transmit power level in channel N | Channel number M | Maximum transmit power level in channel M | Channel number K | Maximum transmit power level in channel K | Validity time |
|---|---|---|---|---|---|---|---|
| Personal/ portable device | 2 | 40mW | 3 | 100mW | 4 | 40mW | |

| | Device type | Channel number M | Maximum transmit power level in channel M | Validity time |
|---|---|---|---|---|
| | Fixed & personal/portable device | 3 | 100mW | |

| | Device type | Channel number N | Maximum transmit power level in channel N | Channel number M | Maximum transmit power level in channel M | Validity time |
|---|---|---|---|---|---|---|
| | Personal/portable device | 2 | 40mW | 4 | 40mW | |

METHOD AND APPARATUS FOR
TRANSMITTING AND RECEIVING
CHANNEL INFORMATION IN WIRELESS
COMMUNICATION SYSTEM

This is a U.S. National Phase Entry of PCT Application No. PCT/KR2012/000040, filed Jan. 3, 2011, and claims the benefit of U.S. Provisional Application Nos. 61/504,714; 61/446,455; 61/432,192; and 61/429,199 filed Jul. 6, 2011, Feb. 24, 2011, Jan. 12, 2011, and Jan. 3, 2011, respectively.

TECHNICAL FIELD

The present invention relates to an apparatus capable of transmitting and receiving channel information in a wireless communication system and a method of controlling therefor.

BACKGROUND ART

A standard for a wireless local area network (WLAN) technology has been developed as IEEE (Institute of Electrical and Electronics Engineers) 802.11 standard. IEEE 802.11a or IEEE 802.11b uses an unlicensed band in 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps in a manner of applying Orthogonal Frequency Division Multiplexing (OFDM) in 2.4 GHz. IEEE 802.11n provides transmission speed of 300 Mbps for 4 spatial streams in a manner of applying Multiple Input Multiple Output-OFDM (MIMO-OFDM). IEEE802.11n supports a channel bandwidth up to 40 MHz. In this case, IEEE802.11n provides transmission speed of 600 Mbps.

IEEE 802.11af standard is a standard set to regulate an operation of an unlicensed device in a TV whitespace (TVWS) band.

The TVWS is a frequency assigned to a broadcast TV and includes an Ultra High Frequency (UHF) band and a Very High Frequency (VHF). The TVWS means a frequency band permitted to an unlicensed device to use under a condition that the unlicensed device does not impede a communication of a licensed device operating in a corresponding frequency band. The licensed device can include a TV, a wireless microphone, and the like. The licensed device can be called an incumbent user or a primary user. And, in order to solve a coexistence problem between unlicensed devices using the TVWS, it may be necessary to have such a signaling protocol as a common beacon frame and the like, frequency sensing mechanism, and the like.

Although operations of all unlicensed devices are permitted on 512~608 MHz and 614~698 MHz except several special cases, a communication between fixed devices is only permitted on 54~60 MHz, 76~88 MHz, 174~216 MHz, 470~512 MHz. A fixed device indicates a device performing a signal transmission at a fixed position only. IEEE 802.11 TVWS terminal means an unlicensed device operating by using IEEE 802.11 MAC (media access control) and a physical layer (PHY) in a TVWS spectrum.

The unlicensed device wishing to use the TVWS should provide a protection function for a licensed device. Hence, the unlicensed device should check whether the licensed device occupies a corresponding band before starting a signal transmission in the TVWS.

To this end, the unlicensed can check whether the corresponding band is used by the licensed device in a manner of performing a spectrum sensing. A spectrum sensing mechanism includes an energy detection scheme, a feature detection scheme, and the like. If strength of a signal received from a specific channel is greater than a certain value or a DTV preamble is detected, the unlicensed device can judge that the specific channel is currently used by the licensed device. And, if it is judged that the licensed device currently uses a channel adjacent to the channel currently used, the unlicensed device should lower a transmit power.

And, the unlicensed device should obtain channel list information capable of being used by the unlicensed device in a corresponding area in a manner of accessing a database (DB) via the internet or a dedicated network. The DB is a database storing and managing information on the licensed device registered in the DB and a channel use information, which dynamically varies according to a geographical location of the corresponding licensed devices and hours of use.

In explaining the present specification, a white space band includes the aforementioned TVWS, by which the present invention may be non-limited. In the present specification, a terminology of white space band means a band preferentially permitting an operation of the licensed device and the band permitting an operation of the unlicensed device only when a protection for the licensed device is provided. And, a white space device means a device operating in the white space band. For instance, a device according to an IEEE 802.11 system may become an example of the white space device. In this case, the white space device may indicate the unlicensed device operating in the white space band using the IEEE 802.11 MAC (Medium Access Control) layer and the PHY (Physical) layer. In particular, a general AP according to 802.11 standard and/or an STA operating in the white space band may correspond to an example of the unlicensed device.

DISCLOSURE OF THE INVENTION

Technical Tasks

As mentioned in the foregoing description, the unlicensed device operating in the white space band obtains information on an available channel and can operate in the white space band using the information.

Yet, the information on the available channel of which the unlicensed device operating in the white space band intends to obtain may have a different format depending on a country. In particular, since the information on the available channel according to a country can be delivered according to such a different format as a TV channel unit, a TV channel bandwidth unit, a channel frequency unit, and the like, it is necessary to have a method of informing a format of the information on the available channel, which varies according to a country.

Hence, a technical task of the present invention is to provide a method of signaling the information on the available channel of the unlicensed device operating in the white space band and the format of the information on the available channel together.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of performing a communication, which is performed by an unlicensed device permitted to operate in an available channel where a licensed device does not use in a white space band, by obtaining information on the available channel includes the steps of transmitting a message requesting the information on the available channel to a database device, receiving the information on the available channel including first information indicating a format of the information on the available channel and second information for identifying the available channel from the database in response to the message requesting the information on the available channel, and obtaining the second information using the first information and transceiving a signal in an available channel corresponding to the second information, wherein the format of the information on the available channel is changeable according to a country.

Preferably, the white space band may correspond to a TV white space band.

Preferably, the information on the available channel including a first format among the format of the information on the available channel changeable according to a country can be configured in a channel unit.

Preferably, the information on the available channel including a second format among the format of the information on the available channel changeable according to a country can be configured in a channel bandwidth unit.

Preferably, the information on the available channel including a third format among the format of the information on the available channel changeable according to a country can be configured in a channel bandwidth unit on the basis of a center frequency.

Preferably, the information on the available channel including a fourth format among the format of the information on the available channel changeable according to a country can be configured in a frequency unit.

More preferably, the information on the available channel including the fourth format may include a start frequency and a stop frequency of the available channel.

Preferably, the information on the available channel further includes a third information indicating a validity time of the available channel and the signal can be transmitted and received for the validity time corresponding to the third information.

To further achieve these and other advantages and in accordance with the purpose of the present invention, an unlicensed device permitted to operate in an available channel where a licensed device does not use in a white space band includes a transceiver configured to transmit a message requesting the information on the available channel to a database device and the transceiver configured to receive the information on the available channel including first information indicating a format of the information on the available channel and second information for identifying the available channel from the database in response to the message requesting the information on the available channel and a processor configured to obtain the second information using the first information and the processor configured to control the transceiver to transceive a signal in an available channel corresponding to the second information, wherein the format of the information on the available channel is changeable according to a country.

Preferably, the white space band may correspond to a TV white space band.

Preferably, the information on the available channel including a first format among the format of the information on the available channel changeable according to a country can be configured in a channel unit.

Preferably, the information on the available channel including a second format among the format of the information on the available channel changeable according to a country can be configured in a channel bandwidth unit.

Preferably, the information on the available channel including a third format among the format of the information on the available channel changeable according to a country can be configured in a channel bandwidth unit on the basis of a center frequency.

Preferably, the information on the available channel including a fourth format among the format of the information on the available channel changeable according to a country can be configured in a frequency unit.

More preferably, the information on the available channel including the fourth format may include a start frequency and a stop frequency of the available channel.

Preferably, the information on the available channel further includes a third information indicating a validity time of the available channel and the processor is configured to control the transceiver to transceive the signal for the validity time corresponding to the third information.

Advantageous Effects

According to the present invention, a method of signaling the information on the available channel of the unlicensed device operating in the white space band and an apparatus therefor can be provided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 6 is a flowchart for explaining a mode of an STA, which operates in relation to the present invention, operating in a manner of obtaining available channel information from a device including database information;

FIG. 7 is a diagram of an example of a white space map in a white space in relation to the present invention;

FIG. 8 is a diagram for explaining a type of device operating in a WLAN system used in the present invention;

FIG. 9 is a diagram for explaining with an example that an available channel varies according to a device type;

FIG. 10 is a diagram of a different example of a white space map in a white space in relation to the present invention;

FIG. 11 is a diagram of an example of a channel scheduling request frame structure in a white space in relation to the present invention;

FIG. 12 is a diagram of an example of a channel scheduling response frame structure in a white space in relation to the present invention;

FIG. 13 to FIG. 14 is a diagram of a further different example of a white space map in a white space in relation to the present invention;

FIG. 15 is a diagram of a further different example of a white space map in a white space in relation to the present invention;

FIG. 16 and FIG. 17 are diagrams of a further different example of a white space map in a white space in relation to the present invention;

FIG. 18 and FIG. 19 are diagrams of a further different example of a white space map in a white space in relation to the present invention;

FIG. 20 and FIG. 21 are diagrams for explaining a method of transmitting information on available channel in a manner of differentiating according to each device in a white space in relation to the present invention;

BEST MODE

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

First of all, a general configuration of a wireless local area network is described with reference to FIG. 1 and FIG. 2.

Figure 1:
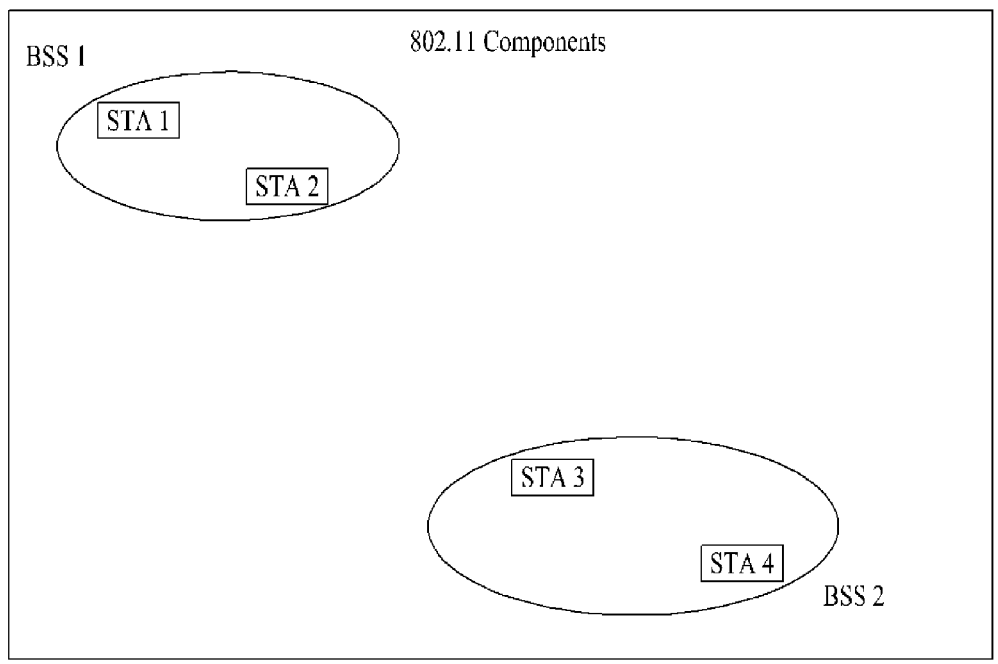
FIG. 1 is a diagram of one example of a configuration of a wireless local area network system.

FIG. 1 is a diagram of one example of a configuration of a wireless local area network system.

As depicted in FIG. 1, a wireless local area network includes at least one Basic Service Set (BSS). The BSS is a set of a station (STA) capable of communicating by successfully performing synchronization.

The STA is a logical entity including a physical layer interface for a Medium Access Control (MAC) and wireless media. The STA includes an access point (AP) and a Non-AP STA (Non-AP station). A mobile terminal operated by a user corresponds to the Non-AP STA among the STAs. If it is simply called an STA, the STA may correspond to the Non-AP STA. The Non-AP STA can be called such a different name as a terminal, a Wireless Transmit/Receive Unit (WTRU), User Equipment (UE), a Mobile Station (MS), a Mobile Terminal, a Mobile Subscriber Unit, or the like.

And, the AP is an entity providing an STA associated to the AP with an access to a distribution system (DS) via the wireless media. The AP can be called a concentrated controller, a Base Station (BS), a Node-B, a Base Transceiver System (BTS), a site controller, or the like.

The BSS can be divided into an infrastructure BSS and an independent BSS (IBSS).

The BSS depicted in FIG. 1 corresponds to the IBSS. The IBSS means the BSS not including an AP. Since the IBSS does not include the AP, an access to the DS is not permitted to the IBSS. Thus, the IBSS forms a self-contained network.

Figure 2:
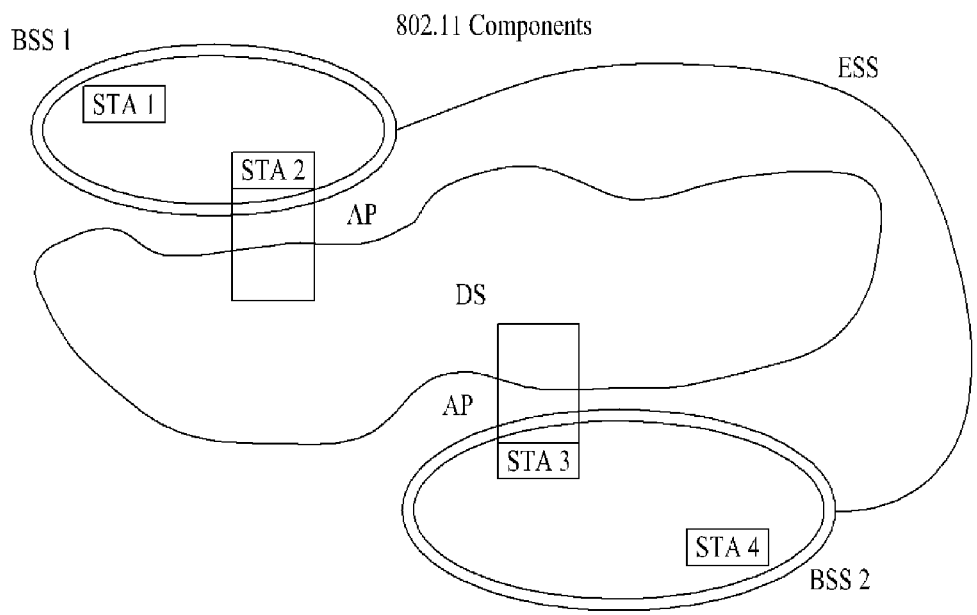
FIG. 2 is a diagram of a different example of a configuration of a wireless local area network system.

FIG. 2 is a diagram of a different example of a configuration of a wireless local area network system.

The BSS depicted in FIG. 2 corresponds to an infrastructure BSS. The infrastructure BSS includes at least one STA and an AP. Although a principle of a communication between non-AP STAs is to perform the communication via the AP, if a link is directly established between the non-AP STAs, it is possible to directly communicate between the non-AP STAs.

As depicted in FIG. 2, a plurality of infrastructure BSSs can be connected to each other via the DS. A plurality of the infrastructure BSSs connected through the DS is called an Extended Service Set (ESS). STAs included in the ESS can communicate with each other and a non-AP STA can move from one BSS to another BSS while seamlessly communicating in an identical ESS.

The DS is a mechanism connecting a plurality of APs to each other and the DS is not necessarily to be a network. If the DS is able to provide a prescribed distribution service, there is no limit on a form of the DS. For instance, the DS may correspond to such a wireless network as a mesh network or may correspond to a physical structure connecting APs to each other.

A spectrum not used by a licensed device is called a whitespace and the whitespace can be used by an unlicensed device. In order for an STA to operate in a whitespace spectrum, it is necessary to preferentially provide a protection scheme for the licensed device (incumbent user). In order for the STA or an AP to protect the licensed device, the STA or the AP should use a channel not used by the licensed device only. The channel capable of being used by the unlicensed device, since it is not used by the licensed device, is called an available channel. A most basic method for the STA or the AP to identify availability of a TV channel is a spectrum sensing and a method of finding out a TV channel schedule by accessing a database (DB). DB information includes the information on a schedule of a specific channel used by the licensed device in a specific location, and the like. Hence, in order to identify whether the TV channel is available, the STA or the AP should obtain the DB information based on location information of the STA or the AP in a manner of accessing the DB via the internet.

In order for an STA to access a network, the STA should find out a network eligible to participate. Before participating in a wireless network, the STA should identify a compatible network. A process of identifying a network existing in a specific area is called a scanning.

A scanning scheme includes an active scanning and a passive scanning.

Figure 3:
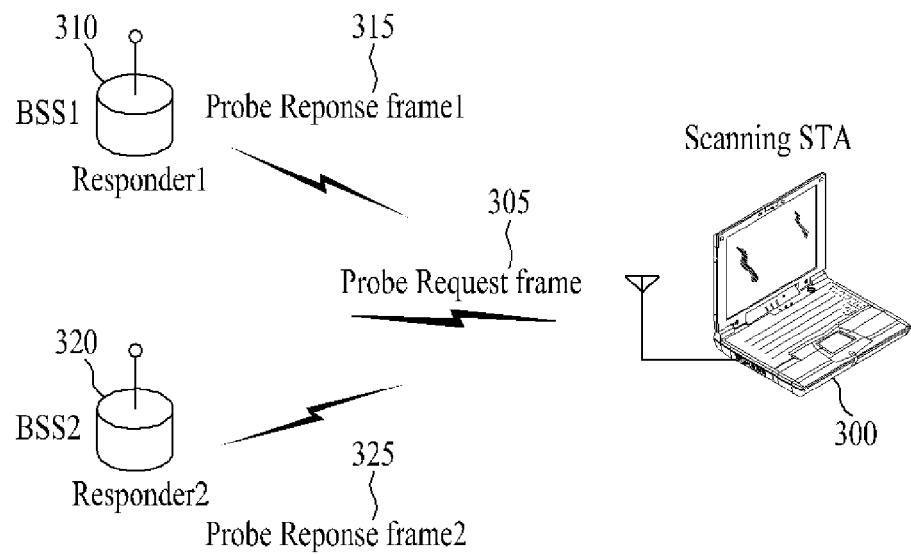
FIG. 3 is a schematic diagram of an active scanning.

FIG. 3 is a schematic diagram of an active scanning.

An STA performing a scanning in the active scanning moves around channels, transmits a probe request frame and waits for a response for the probe request frame to investigate which AP is existing in the vicinity of the STA. A responder transmits a probe response frame to the STA, which transmitted the probe request frame, in response to the probe request frame. In this case, the responder corresponds to an STA lastly transmitted a beacon frame in the BSS of a channel, which is currently scanned. In the infrastructure BSS, since an AP transmits a beacon frame, the AP corresponds to the responder. On the contrary, in the IBSS, since STAs in the IBSS transmit the beacon frame in turn, the responder is not constant.

Referring to FIG. 3, if a scanning STA 300 transmits a probe request frame 305, a responder 1 310 of a BSS1 and a responder 2 320 of a BSS2, which received the probe request frame, transmit a probe response frame 1 315 and a probe response frame 2 325 to the scanning STA 300, respectively. Having received the probe response frame, the scanning STA 300 stores BSS-related information included in the received probe response frame, moves to a next channel, and performs a scanning with an identical method in the next channel.

Figure 4:
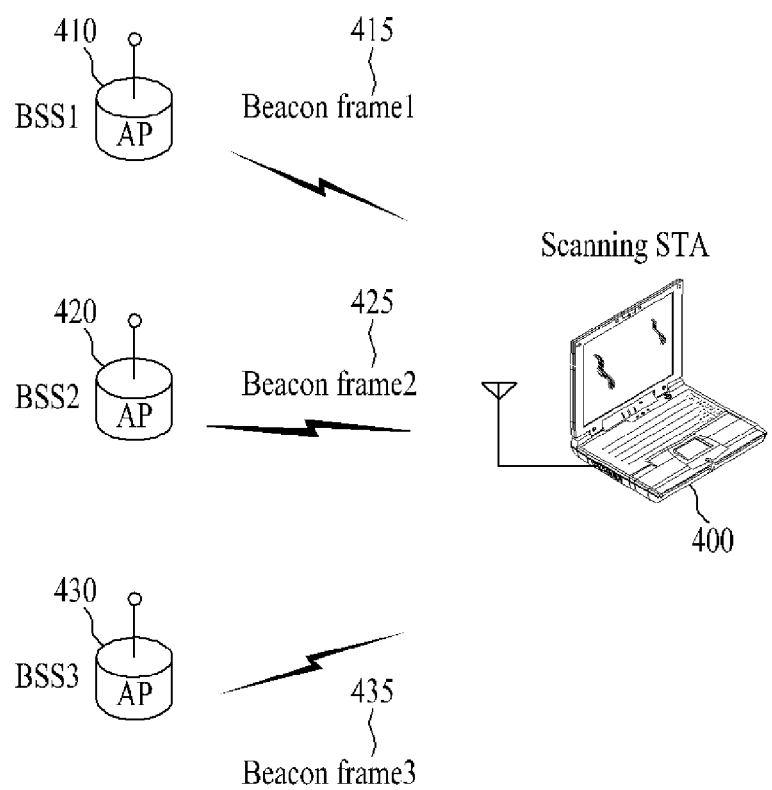
FIG. 4 is a schematic diagram of a passive scanning.

FIG. 4 is a schematic diagram of a passive scanning.

An STA performing a scanning in a passive scanning waits for a beacon frame by moving around channels. The beacon frame is one of management frames in IEEE 802.11. The beacon frame informs an existence of a wireless network and is periodically transmitted to enable the STA performing the scanning to participate in the wireless network by finding out the wireless network. In the infrastructure BBS, an AP plays a role of periodically transmitting the beacon frame.

Having received the beacon frame, the STA performing the scanning stores the information on the BSS included in the beacon frame, moves to a different channel, and records beacon frame information in each channel.

Referring to FIG. 4, a scanning STA 400 performing a channel scanning in a specific channel with a passive scanning scheme receives a beacon frame 1 415 transmitted by an AP1 410 of a BSS1 and a beacon frame 2 425 transmitted by an AP2 420 of a BSS2. If the scanning STA does not receive a beacon frame 3 435 transmitted by an AP3 430 of a BSS3, the scanning STA 400 stores information that 2 BSSs (BSS1 and BSS2) are detected in a measurement channel and moves to a different channel.

Compared the active scanning with the passive scanning, there exists a merit in that the active scanning has a less delay and less power consumption than the passive scanning.

In the following description, a process of enablement for an STA to operate in a whitespace band is explained.

The unlicensed device operating in the whitespace band can be classified into an enabling STA and a dependent STA. The enabling STA is an STA enabling the dependent STA, can transmit a signal without receiving an enabling signal, and can initiate a network.

The enabling STA provides a database (DB) with geo-location information and can obtain available channel information capable of being used in a corresponding geo-location from the DB. The enabling STA does not need to be a WLAN STA and may correspond to a logical entity capable of providing enabling-related services or may correspond to a network server.

The dependent STA is an STA capable of transmitting a signal in a manner of receiving an enabling signal only. The dependent STA is controlled by the enabling STA. The dependent STA should be enabled by the enabling STA and cannot be independently enabled.

Figure 5:
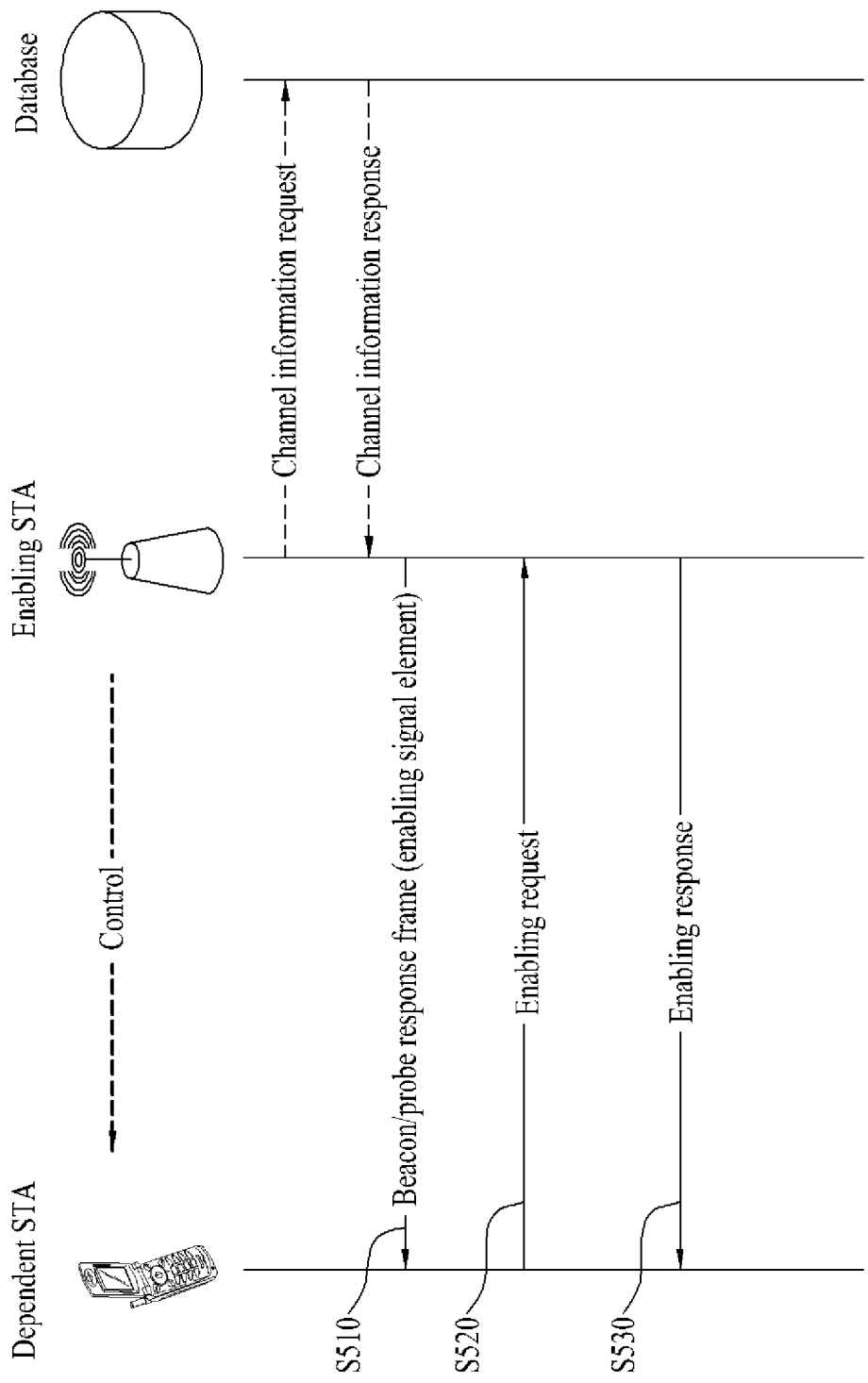
FIG. 5 is a diagram of an enabling process of an STA.

FIG. 5 is a diagram of an example of an enabling process of an STA.

IEEE 802.11y is a standard constructed for the unlicensed device operating on 3.5 GHz. The standard describes an enabling process and the enabling process is called a dynamic STA enablement (DSE). A process of enabling the dependent STA by the enabling STA may follow a process similar to the dynamic STA enablement of IEEE 802.11y. Although the enabling process practically applied to the whitespace may not be same with the process of the DSE, it is basically identical in a point that the dependent STA can transmit a signal to a corresponding band/channel only after receiving an enabling signal.

As depicted in FIG. 5, the enabling STA can transmit a beacon including an enabling signal or a probe response frame to the dependent STA [S510]. A signal indicating that an enabling is available is called an enabling signal. In an example of FIG. 5, the beacon including an enabling signal element or the probe response frame corresponds to the enabling signal. Having received and decoded the enabling signal, the dependent STA transmits an enablement request frame to the enabling STA using a channel received the corresponding signal [S520] and receives an enablement response frame from the enabling STA [S530].

Configuration of Available Channel Information

In order for not an incumbent user but the unlicensed device to operate in the whitespace band, the corresponding unlicensed device obtains information on a channel not interfering the incumbent user in a specific location, i.e., an available channel to protect the incumbent user and can operate according to the information. The information on the available channel may include an available channel list, which is a set of one or more available channels.

As mentioned in the foregoing description, the information on the available channel obtained by the enabling STA from the DB and/or the information on the available channel (or the available channel list) obtained by the dependent STA from the enabling STA can be provided in a form of a White Space Map (WSP). The available channel list (WSM) can be transmitted and received between the STAs according to the example depicted in FIG. 5 or can be provided via a Channel Availability Query (CAQ) request/response and the like.

The WSM can determine whether which channel is used by the AP and/or the STA operating in the whitespace.

Regarding a channel configuration in the whitespace band, it is explained with reference to a case of TVWS band. Yet, a scope of the present invention is not limited to the unlicensed device-related operation in the TVWS and the scope of the present invention can be applied to the unlicensed device-related operation in a general whitespace.

The TVWS can include such a legacy frequency band as VHF and UHF. Such devices (TVDB (TV Band Devices)) operating in the TVWS as an AP, an STA, and the like can use about 30 channels and a system bandwidth unit of a single channel may basically correspond to 6 MHz. In order for the unlicensed device (e.g., AP and/or STA) to use a channel of the TVWS, it is strongly required for the channel not to have an incumbent user in the channel. And, since the system bandwidth unit used by the incumbent user is 6 MHz, the system bandwidth used by the unlicensed device should be less than 6 MHz. In this case, since IEEE 802.11a system supports channel bandwidths of 5 MHz/10 MHz/20 MHz, 5 MHz can be used as a basic channel bandwidth when the unlicensed device operates. And, according to how many consecutive channels exist where the incumbent user is not included in the TVWS, the bandwidth of a channel capable of being used by the unlicensed device may correspond to either 10 MHz or 20 MHz.

In the following description, a mode of the enabling STA operating by obtaining available channel information from the DB or a mode of the dependent STA operating by obtaining available channel information from the enabling STA is explained.

FIG. 6 is a flowchart for explaining a mode of an STA, which operates according to one embodiment of the present invention, operating in a manner of obtaining available channel information from a device including database information.

For clarity of explanation, a case of TVWS is explained as an example. Yet, a scope of the present invention is not limited to the unlicensed device-related operation in the TVWS only and the scope of the present invention can be applied to the unlicensed device-related operation in a general whitespace.

First of all, the STA operating as the unlicensed device in the TVWS can transmit an available channel information request message to a device including database information [S210]. In this case, the STA transmitting the available channel information request message may correspond to either the enabling STA or the dependent STA.

In this case, the available channel information request message transmitted by the enabling STA or the dependent STA may have a form as follows.

TABLE 1

| Order | Information |
|---|---|
| 1 | Category |
| 2 | Action |
| 3 | Destination MAC Address |
| 4 | Source MAC Address |
| 5 | Supported Channels |

As shown in Table 1, the available channel information request message can include a category field (Category), an operation value field (Action), a source address field (Source Address), a destination address field (Destination address), and an identification information field for one or more available channels (Supported Channels).

The category field can indicate a category of the available channel request message. The operation value field can indicate an operation to perform via the available channel information request message in the category. If the enabling STA or the dependent STA transmits the available channel information request message, the source address field can indicate the address of the enabling STA or the dependent STA. If a specific enabling STA or an STA belonging to the dependent STA transmits the available channel information request message, the source address field can indicate the address of the corresponding STA. And, if a main entity receiving the available channel information request message corresponds to an RLS (DB), the destination address field can indicate the address of the RLS (DB). If the main entity receiving the available channel information request message corresponds to the enabling STA or the dependent STA, the destination address field can indicate the address of the enabling STA or the dependent STA. And, the available channel information request message can include channel identification information supported by an STA, which transmits a message. If the channel identification information indicates a plurality of channels, the information can be transmitted in a list form for a plurality of the channels.

Having received the aforementioned available channel information request message, the RLS (DB) or the enabling STA can transmit an available channel information response message to the enabling STA or the dependent STA in response to the available channel information request message [S220].

In this case, the available channel information response message may include at least one selected from the group consisting of the following informations.

(a) available channel identification information (b) maximum permissible power information in an available channel (c) available time information of an available channel Meanwhile, according to a different embodiment of the present invention, the available channel information response message can be transmitted in a manner of omitting (b) maximum permissible power information in an available channel according to the usage of the available channel information response message. In case of an embodiment where (B) maximum permissible power information in an available channel is omitted, since it is possible to consider that the operation related to the (b) is omitted only, for clarity, assume that the available channel response message includes all of the (a) to (c) in the following description. Yet, it is necessary to be cautious that the operation related to the (B) can be omitted.

Maximum power permitted according to available channels, which are available to the unlicensed device in the TVWS, may be different from each other. For instance, if a CH1, a CH2, and a CH3 are informed as available channels, maximum transmit power permitted to each channel may be different from each other in consideration of an impact affecting an adjacent channel. For instance, the maximum transmit power permitted to each of the CH1, the CH2, and the CH3 may differently correspond to 40 mW, 100 mW, and 40 mW, respectively. Maximum permissible power information in an available channel may inform each of the available channels of maximum permissible power. The maximum permissible power may correspond to the maximum permissible power following a FCC regulation.

Meanwhile, the available time information of the available channel can inform the device received the available channel information response message of assignment time information, which permits the device to use a corresponding available channel. As mentioned in the foregoing description, the unlicensed device operating in the TVWS should perform a protection function for the licensed device. The protection function for the licensed device can be efficiently controlled in a manner that the information on the available channel is informed to the unlicensed device together with the available time information for the corresponding available channel. For instance, if the available time for the available channel indicates 10 minutes, having received the available time information, the AP/STA can use the indicated available channel for 10 minutes from a reception timing point. After that, the AP/STA can obtain available channel information in a manner of transmitting the available channel information request message again to the device (RLS (DB)/(AP)) including database information.

The (a) to (c) information can be repeated as many as the number of available channels. The following Table 2 indicates an example of the aforementioned available channel information response message.

TABLE 2

| Order | Information |
|---|---|
| 1 | Category |
| 2 | Action |
| 3 | Destination MAC Address |
| 4 | Source MAC Address |
| 5 | Target Channel(s) |
| 6 | White Space Available Time(s) |
| 7 | Power Constraint(s) |

Referring to Table 2, the category field (category), the operation value field (action), the destination address field (destination address), the source address field (source address) are identical to Table 1. In Table 2, "Target Channel(s)" includes available channel identification information, which is to be used for WLAN operation by the STA receiving the present message (a), "White Space Available Time(s)" includes validity time information of each available channel (b), and "Power constraint(s)" can indicates maximum transmit power permitted to each available channel.

Having received the aforementioned available channel information, the enabling STA or the dependent STA performs a WLAN operation in a manner of utilizing the received information [S230]. Specifically, having received the aforementioned available channel information, the device can transmit and receive a WLAN signal in the available channel according to the received information for the indicated validity time using the power less than the indicated maximum permissible power. Specifically, in case that a specific enabling STA receives the aforementioned available channel information response message from the RLS (DB), the enabling STA can deliver all or a part of the received information to the dependent STAs belonging to the enabling STA. And, in case that the dependent STA belonging to the enabling STA receives the aforementioned available channel information response message, such WLAN operations as performing a scanning operation to establish a network connection and the like are limited to the available channel, which is indicated by the received available channel information response message, thereby reducing a burden of scanning/sensing and the like.

As mentioned in the foregoing description, the available channel information (or available channel list) can be provided in a form of a White Space Map (WSM).

The WSM includes information on whether a TV signal occupies a channel. A channel number capable of being used by the unlicensed devices on a specific timing point, a maximum power value permitted to a corresponding channel, information on valid period of each available channel, and the like can be indicated in a list form for the WSM.

For clarity of explanation, assumes that the whitespace corresponds to the TVWS in the following description. Yet, a scope of the present invention is not limited to the unlicensed device-related operation in the TVWS only and the scope of the present invention can be applied to the unlicensed device-related operation in a general whitespace.

Meanwhile, in this case, a format or structure of the applied WSM can be differently used according to a country. For instance, when a database signals for an available channel, the WSM can be delivered on the basis of the format configured according to a TV channel.

And, a base unit of the WSM may correspond to a TV channel bandwidth. If a smallest base unit configuring an available channel list, which is provided by a database on a TVWS bandwidth, corresponds to the TV channel bandwidth, the base unit of a channel map corresponds to the TV channel bandwidth. The TV channel bandwidth of the United States of America and the Republic of Korea is 6 MHz. The TV channel bandwidth is defined as 7 MHz or 8 MHz according to a country.

And, instead of informing the WSM according to a TV channel when the database signals for the available channel, a channel, which is empty because licensed users do not use the channel, can be delivered on a frequency.

And, in case that the WSM is commonly delivered according to a TV channel by at least one country, the WSM may become a different form including information on validity time according to an available channel or a different form signaled in a form of a bitmap.

As mentioned in the above, the WSM can be delivered according to such a different format as a unit according to a TV channel, a TV channel bandwidth unit, a channel frequency unit, and the like. The structure or format of the WSM can be modified according to a country. In particular, among a plurality of countries, a first country can use a WSM structure of the unit according to a TV channel, a second country can use the WSM structure of the TV channel bandwidth unit, and a third country can use the WSM structure of the channel frequency unit.

Hence, one embodiment of the present invention proposes a method of setting the information indicating the WSM structure, which is applied to a corresponding country among a plurality of WSM structures applied according to each country, to be included in WSM information.

For clarity of explanation, a field indicating the information on the WSM structure, which is applied to the corresponding country to which an STA is belong thereto, is called a first field in the following description.

The first field is set to include the information of the first filed in a manner of utilizing a field, which is added to the WSM as a new field or included in the conventional WSM, or can be delivered via an additional information transmission operation.

In the following description, various WSM formats modifiable according to a country and the first field are explained with reference to a detail embodiment.

1$^{st}$ Embodiment

First of all, a format shown in FIG. 7 can be used as a feasible example of the WSM format.

In the WSM format depicted in FIG. 7, a 'country code' field provides information on a position of a channel map following a corresponding field. In particular, a range of a TV band and a bandwidth of a TV channel may be different from each other according to a country and a regulatory domain followed by the range of a TV band and the bandwidth of a TV channel becomes diversified as well. Hence, the country code field makes a user understand a physical location of a TV channel available to an STA, which receives a WSM, together with a channel map field. A country string value of 3 octets can be signaled for the country code field. In particular, the first 2 octets indicate a country code defined by ISO/IEC 3166-1 and the last octet means an environment. The corresponding field can expansively include more detail information compared to country information. For instance, the corresponding field can include an area code value of a specific country.

And, the first field indicating the information on a form of the WSM format according to the 1$^{st}$ embodiment can be included in the WSM. Although it is not depicted in FIG. 7, the separate first field can be added to the format depicted in FIG. 7 or the information of the first field can be included in one of the conventional fields. For instance, the information of the first field may further be included in the country code field. And, the information related to the first field can be delivered via a separate signaling.

2$^{nd}$ Embodiment

Meanwhile, according to one embodiment of the present invention, the aforementioned WSM information may correspond to the format further including device type information to which corresponding WSM information is additionally applied.

FIG. 8 is a diagram for explaining a type of device operating in a WLAN system used in the present invention.

In the WLAN system to which the present invention is applied, a device type can be largely divided into a fixed device and a personal/portable device. In a WLAN system, the fixed device can start a network by transmitting an enabling signal to one or more fixed devices and the personal/portable device according to a regulation. FIG. 8 depicts a case that the fixed device operates as an enabling STA of the different fixed device and the personal/portable device via a beacon and the like and a case that the fixed device informs the different fixed device and the personal/portable device of a channel map in the enabling signal.

As mentioned in the foregoing description, the present embodiment proposes that device type information to which corresponding WSM information is to be applied is included in the WSM information because an available channel and a maximum permissible power value can vary according to a device type. In case of the fixed device, the fixed device cannot use a channel immediately adjacent to a TV channel currently used by an incumbent user. Yet, in case of the personal/portable device, the channel immediately adjacent to the TV channel currently used by the incumbent user can be used by the personal/portable device under a condition that the maximum permissible power value is reduced from 100 mW to 40 mW.

Hence, it is preferable to include the device type information in the WSM together with the available TV channel number and a maximum transmit power field corresponding to each of the available TV channels according to the FCC regulation. FIG. 8 depicts that the fixed device operating as a master transmits a channel map (e.g., the WSM) to the different fixed device and the personal/portable device operating as clients. Specifically, FIG. 8 depicts that the WSM (WSM where the device type field indicates the fixed device) for the fixed device is transmitted to the fixed device and the WSM (WSM where the device type field indicates the personal/portable device) for the personal/portable device is transmitted to the personal/portable device in a manner of adding the device type to each of the WSMs.

In the present embodiment, the device type does not mean to signal a type of a device transmitting a corresponding WSM but means to signal the type of the device capable of using the corresponding WSM. The device type can signal such information as the type of the fixed device and the personal/portable device together with a frequency mask (spectrum mask) value of an STA capable of using the corresponding WSM as it is.

It is assumed that the fixed device according to the present embodiment cannot use the WSM where the device type is set to the personal/portable device. This is because if the device type is set to the personal/portable device in the WSM, a channel not capable of being used by the fixed device can be included as the channel capable of being used by the fixed device.

FIG. 9 is a diagram for explaining with an example that an available channel varies according to a device type.

In FIG. 9, assume that the very left TV channel is 21 and the last TV channel is 25. In case that an incumbent user occupies the TV channel 21 and the TV channel 25, a fixed type device can operate on a TV channel 23 with 100 mW maximum power except the channels (22, 24) adjacent to the channels occupied by the incumbent user. A personal/portable type device can operate on the 23th and 24th channel, which correspond to the adjacent channels, with 40 mW maximum power and can operate on the 23th channel with 100 mW maximum power.

In particular, the information of a channel map varies according to the device type. Hence, the fixed device and the personal/portable device receiving a WSM should be able to distinguish whether the channel map is for the fixed device or the personal/portable device. If the fixed device operating in a master mode indicates whether the corresponding channel map is for the fixed device or the personal/portable device via the device type, this can be enabled.

FIG. 10 is a diagram of a WSM structure according to a preferred embodiment of the present invention.

The WSM according to the present embodiment can include a device type field, a map ID field, a channel number field, a maximum power level field, a validity time field, and the like. As mentioned in the foregoing description, the device type field can be used to indicate whether a present WSM is for the fixed type device or the personal/portable type device.

The map ID field can be used to distinguish a corresponding WSM from a different WSM and the channel number field can indicate a TV channel number available in a TVWS. Yet, the present invention does not exclude a case that an available channel is informed not by a channel number but by a different way (for instance, a case of informing an available frequency, which is described later) according to embodiment. And, as mentioned in the foregoing description, the maximum power level field can indicate a maximum power level permissible according to a FCC regulation in each available channel.

And, as mentioned earlier, a field indicating validity time information on an available channel according to the WSM can be included. The validity time field can indicate validity time information according to each of available channels and can indicate the validity time information for a whole of the WSM. If a corresponding WSM is the WSM for the fixed type device, the validity time field can include validity time information on each of the available channels. Yet, in case of such a device (hereinafter abbreviate a first mode device) communicating in a manner of belonging to a specific AP as an STA, the validity time information on each of the available channels may not necessary. Instead, in case of the first mode device, it may be able to check whether received WSM information is valid by checking a confirmation signal on every specific interval (e.g., on every 60 seconds). Specifically, the validity time information can be differently determined according to the device type and can be omitted according to the device type.

And, a first field indicating information on a form of a WSM format according to $2^{nd}$ embodiment can be included in the WSM. Although it is not depicted in FIG. 10, the separate first field can be added to the format depicted in FIG. 10 or the information of the first field can be included in one of the conventional fields. For instance, the information of the first field can be further included in the device type field. And, the information related to the first field can be delivered via a separate signaling.

$3^{rd}$ Embodiment

According to one embodiment of the present invention, the validity time field of the WSM, which is mentioned earlier in the $2^{nd}$ embodiment, can be set to construct the validity time field in a manner that the device (e.g., an enabling STA or a dependent STA) transmitting the WSM performs a database query for each of the available channels which are constructing the WSM.

To this end, the enabling STA or the dependent STA can transmit a channel scheduling request frame to a database.

FIG. 11 is a diagram of a channel scheduling request frame structure according to one example of the present invention.

The channel scheduling request frame can include channel scheduling information, i.e., a channel list for obtaining available start time and available duration of a specific TV channel. In FIG. 11, an available channel number field can indicate the channel list. For instance, if available channel list corresponds to a CH1, a CH2, a CH3, and a CH4, the channel scheduling request frame can be transmitted in a manner of including the channel number 1, 2, 3, and 4. In the present example, assume that the enabling STA or the dependent STA making a request for the channel scheduling information already knows the available channel list via the WSM.

In FIG. 11, an address of requesting STA (Requester STA Address) field indicates an address of a device transmitting the channel scheduling request frame. An address of responding STA (Responder STA Address) field indicates an address of a device receiving the channel scheduling request frame. A length field may have a different value according to the number of available channels making a request for channel scheduling information. The available channel number field can indicate the available channel number making a request for the channel scheduling information.

According to the present example, having received the channel scheduling request frame, the database can respond to the request of the aforementioned enabling STA or the dependent STA via a channel scheduling response frame including information on the available starting time and the available duration for the channel indicated by the requested channel number (e.g., the available channel number of the channel scheduling request frame).

FIG. 12 is a diagram of a channel scheduling response frame structure according to one example of the present invention.

In FIG. 12, an address of requesting STA (Requester STA Address) field indicates an address of a device transmitting the channel scheduling request frame. An address of responding STA (Responder STA Address) field indicates an address of a device receiving the channel scheduling request frame. A length field indicates a total length of the channel scheduling information. An available channel number field indicates an available channel indicated by the channel scheduling information. An available start time field can indicate the start time of the available channel. An available duration field can indicate the duration of the available channel.

If it is assumed that a start timing point of the available duration is always set to a current time (timing point of receiving a frame), information on the start timing point of the available duration can be omitted. In this case, a channel scheduling type value can be included to inform whether a start time of the available duration is included in the available channel response frame.

If the channel scheduling type corresponds to 0, it is always assumed that the start time of the available duration corresponds to the present time (time of receiving a frame) and the information on the start timing of the available duration may not be included in the channel scheduling frame. On the other hand, if the channel scheduling type corresponds to 1, the information on the start timing point of the available duration may have a future time and the channel scheduling response frame can include the information on the start timing point of the available duration.

And, a first field indicating information on a form of a WSM format according to $3^{rd}$ embodiment can be included in the WSM. Although it is not depicted in FIG. 12, the separate first field can be added to the format depicted in FIG. 11 or FIG. 12. Or, the information of the first field can be included in one of the conventional fields. And, the information related to the first field can be delivered via a separate signaling.

$4^{th}$ Embodiment

According to one embodiment of the present invention, the WSM can be constructed with a format of a TV channel bandwidth unit.

Although a base unit of a channel map signaling whether a channel is available does not mandatorily need to be the TV channel bandwidth, it may correspond to the channel information of a smallest base unit provided by a database of a corresponding regulation area. If the smallest base unit constructing an available channel list, which is provided by the database on a TVWS band, corresponds to the TV channel bandwidth, the base unit of the channel map becomes the TV channel bandwidth. The TV channel bandwidth of the United States of America and the Republic of Korea corresponds to 6 MHz. The TV channel bandwidth is defined as 7 MHz or 8 MHz according to a country.

The channel map field is configured to include an available TV channel number and a maximum transmit power value corresponding to each of the available TV channels according to FCC regulation.

FIG. 13 to FIG. 14 indicates feasible examples for a channel map field.

In FIG. 13 to FIG. 14, K, M, N, L, and S correspond to a random number specifying a TV channel number.

Referring to FIG. 13, the WSM includes device type information, an available channel number (N, M, . . . , K), a maximum permissible power in each available channel, and validity time information applied to a whole of the WSM. As mentioned in the foregoing description, in case of the first mode device, it is more preferable to inform validity time for the whole of the received WSM instead of informing the information on the validity time according to each of the available channels. In this case, a WSM structure shown in FIG. 13 can be used.

According to FIG. 14, the WSM includes device type information, an available channel number (N, . . . , K), and a maximum permissible power in each available channel. As mentioned earlier, in case of the fixed type device or the second mode device, it is preferable to inform the information on the validity time according to each of the available channels. In this case, a WSM structure shown in FIG. 14 can be used.

And, a first field indicating information on a form of a WSM format according to $4^{th}$ embodiment can be included in the WSM. Although it is not depicted, the separate first field can be added to the format depicted in FIG. 13 or FIG. 14. Or, the information of the first field can be included in one of the conventional fields. And, the information related to the first field can be delivered via a separate signaling.

$5^{th}$ Embodiment

According to one embodiment of the present invention, a channel map field may have a structure shown in FIG. 15. In particular, although the channel map can be signaled by a tuple of a channel number and a maximum transmit power level, it can be signaled by a bitmap form as shown in FIG. 15 in consideration of overhead.

Or, the channel map can be signaled by a bitmap in a manner of signaling 1 for an available channel number and 0 for an unavailable channel number among a total channel list. In this case, since an available channel list varies according to a device type, a total length of the channel list and a maximum permissible transmit power value according to each channel can be limited according to the device type.

A TV channel permitted to be transmitted between TVWS 802.11 AP and an STA in US is 6 MHz bandwidth and it corresponds to TV channel 21 to 51. In particular, it is necessary to indicate whether a primary user exists in 30 TV channels. To this end, a bitmap can be configured in a manner that if the primary user exists, 0 (unavailable) is signaled for the TV channels from 21 to 51 in ascending order or descending order. If the primary used does not exist, 1 is signaled for the TV channels in the same manner. Or, the bitmap can be configured in a reverse way.

The device type is an indicator indicating whether a corresponding channel map is for a TV channel area assigned to the personal/portable type device or a TV channel area assigned to the fixed type device. For instance, if the device type correspond to 0, a channel bitmap (bit 1~bit 30) may correspond to bitmap information on TV channel 21~51. It is necessary to indicate whether the primary user exists in 54~60 MHz, 76~88 MHz, 174~216 MHz, and 470~512 MHz, which are assigned for a communication between the fixed type devices, if an STA receiving the channel map is a fixed type or any other necessity is required. To this end, if the device type corresponds to 1, it may be able to make bit 1~bit 18 to be recognized as bitmap information.

In FIG. 15, a Starting Channel Number (S) field means a TV channel number of which a bitmap is started. Number of Channels (L) field means the number of channels in which the bitmap is displayed in a channel map from the starting channel number and a length of the channel map that follows is determined by a value of the Number of Channels field.

And, a first field indicating information on a form of a WSM format according to $5^{th}$ embodiment can be included in the WSM. Although it is not depicted, the separate first field can be added to the format depicted in FIG. 15 in a form of a bitmap. Or, the information of the first field can be included in one of the conventional fields. And, the information related to the first field can be delivered via a separate signaling.

$6^{th}$ Embodiment

According to one embodiment of the present invention, a channel map field may have a structure shown in FIG. 16 and FIG. 17.

Specifically, in case that an available channel is signaled by a database, FIG. 16 is depicted for a case that a channel, which is empty because licensed users do not use the channel, is informed by a frequency instead of being informed by each TV channel. Specifically, FIG. 16 indicates a start frequency, which is about to be available, and a stop frequency where a corresponding frequency block is ended. And, FIG. 16 also shows a case that a maximum transmit power capable of being used in a corresponding section is signaled. And, FIG. 17 depicts a case that validity time information of each available frequency band is additionally informed to the case of FIG. 16. In FIG. 16, since the available frequency band of the unlicensed devices is more likely to exist in a non-contiguous manner according to the frequency use characteristic of the licensed users, a plurality of tuples can be signaled in a channel map field in a manner of repeating 3 tuples consisting of the start frequency, the stop frequency, and the maximum permissible transmit power. Similarly, in FIG. 17, a plurality of quadruplets can be signaled in the channel map field in a manner of repeating 4 quadruplets consisting of the start frequency, the stop frequency, the maximum permissible transmit power, and validity time.

And, a first field indicating information on a form of a WSM format according to $6^{th}$ embodiment can be included in the WSM. Although it is not depicted, the separate first field can be added to the format depicted in FIG. 16 and FIG. 17. Or, the information of the first field can be included in one of the conventional fields. And, the information related to the first field can be delivered via a separate signaling.

$7^{th}$ Embodiment

According to one embodiment of the present invention, a channel map field may have a structure shown in FIG. 18 and FIG. 19.

In FIG. 18 and FIG. 19, when a frequency band capable of being used in a specific timing point at a specific location is signaled, the present invention proposes a method of signaling a center frequency and an available band with a channel bandwidth. In particular, if a frequency of both sides of 10 MHz band is enabled to use on the basis of contiguous 690 MHz, a signaling for this is performed with the center frequency=690 MHz and the channel bandwidth=20 MHz. Available maximum transmit power can also be signaled together with the frequency band signaled as mentioned in the above. An available frequency band is signaled for each of the available channel blocks using the method mentioned in the above.

One embodiment of the present invention proposes a method of signaling, which is signaled by each validity time information for each tuple. Since a frequency use pattern varies according to each of the channels and available duration varies according to each of the channels, it is preferable that the validity time information is signaled for each of the channels. Yet, in case that a signaling is performed for a frequency of a plurality of blocks, to signal the validity time according to each of the available channels may cause overhead on wireless. Thus, it may be better to signal an available channel list at this point and then to signal the validity time information for a whole of the channel map, which is currently signaled, in some system. Hence, a different embodiment of the present invention proposes to include the validity time information on the whole of the channel map. In this case, validity time should be determined as the validity time of a shortest value among the available channels signaled by the channel map and the corresponding value should be delivered as the validity time.

Whether a specific channel is available or not varies according to time. The validity time information is a value indicating how long the channel availability information included in the corresponding channel map is valid, which is informed by a device currently transmitting a WSM information element. When the time information of the validity time field indicates that the information is valid until a specific timing point, the time information can be expressed by absolute time or relative time.

In case of being expressed by the relative time, the time information can be expressed by the information indicating how long the time information is valid from a current transmission timing point. In case of being expressed by the absolute time, the corresponding channel map can indicate the validity time with a UTC. In particular, the corresponding channel map signals that the time information is valid from a specific time irrespective of the current transmission timing point.

Having received the WSM, a device sees the validity time field and judges whether the corresponding WSM is valid. If the WSM is valid, the device recognizes the channel map informed by the corresponding WSM as an available channel and uses it. Otherwise, the device should make a request for a new WSM. In particular, if the dependent STA receives an invalid WSM from the enabling STA, the dependent STA should make a request for transmitting a valid WSM to the enabling STA. If the enabling STA receives the request, the enabling STA should transmit a valid WSM. If there does not exist a valid WSM, it is preferable to transmit valid channel information to the dependent STA and the enabling STA in a manner of querying DB and then obtaining the valid channel information.

The channel map information of the aforementioned embodiments can be exchanged between the database and the unlicensed devices in all regulation areas, which operates under a control of the database. Moreover, the channel map information can be exchanged between the unlicensed devices. In particular, it is preferable that the channel map information is exchanged between an AP and an STA.

And, a first field indicating information on a form of a WSM format according to 7$^{th}$ embodiment can be included in the WSM. Although it is not depicted, the separate first field can be added to the format depicted in FIG. 18 and FIG. 19. Or, the information of the first field can be included in one of the conventional fields. And, the information related to the first field can be delivered via a separate signaling.

8$^{th}$ Embodiment

Meanwhile, a WSM or a channel map can be independently constructed for a fixed type device and a personal/portable type device, respectively. Or, after transmitting the information capable of being commonly applied to each of the device types to the devices, available information capable of being applied to a device of a specific type can be additionally transmitted to the device. In particular, for such a channel capable of being additionally used by the personal/portable type device as the channel adjacent to the channel used by an incumbent user, a device type is set to the personal/portable type device in a manner of collecting the information of the corresponding channel only and the corresponding information can be additionally transmitted. In case of transmitting the information on the available channel capable of being additionally used by the personal/portable type device only, it may be preferable to transmit a map ID of the WSM together with the information.

FIG. 20 and FIG. 21 are diagrams for explaining a method of differently transmitting information on an available channel according to a type of each device in a situation of FIG. 8 according to one embodiment of the present invention.

For instance, according to one embodiment of the present invention, a WSM or a channel map indicating that a channel 3 is available with 100 mW maximum transmit power can be transmitted for a fixed type device and the WSM or the channel map indicating that the channel 3 is available with 100 mW maximum transmit power and a channel 2 and 4 are available with 40 mW maximum transmit power can be transmitted for a personal/portable type device in a situation of FIG. 8.

And, a first field indicating information on a form of a WSM format according to 8$^{th}$ embodiment can be included in the WSM. Although it is not depicted, the separate first field can be added to the format depicted in FIG. 20 and FIG. 21. Or, the information of the first field can be included in one of the conventional fields. And, the information related to the first field can be delivered via a separate signaling.

9$^{th}$ Embodiment

Figures 22, 23, 24:
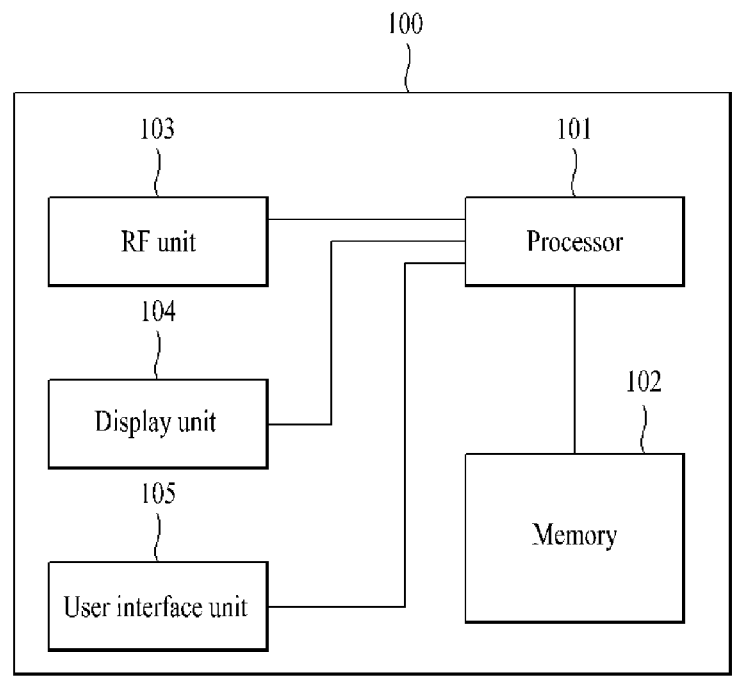
FIG. 22 and FIG. 23 are diagrams for explaining a method of informing an additional available channel for a personal/portable device after informing information on a common available channel according to each device in a white space in relation to the present invention.
FIG. 24 is a block diagram indicating a configuration of a wireless device according to one embodiment of the present invention.

And, according to one embodiment of the present invention, as depicted in FIG. 22 and FIG. 23, a WSM format can be delivered according to a method of informing the personal/portable type device of an additional available channel after informing each device of the information on a common available channel according to the each device in a situation of FIG. 9.

According to a different embodiment, as depicted in FIG. 22, after commonly transmitting the WSM or the channel map indicating that the channel 3 is available with 100 mW maximum transmit power to the fixed type device and the personal/portable type device, it is able to separately inform the personal/portable type device that the channel 2 and 4 are available with 40 mW maximum transmit power in a manner of modifying a device type to a personal/portable type as depicted in FIG. 23. As mentioned in the foregoing description, in case of the WSM additionally transmitted, in order for the devices receiving the additional WSM to easily combine the WSM called by an identical MAP ID, the WSM should use the identical MAP ID. Hence, in case of the WSM corresponding to an object of combination, it is preferable to transmit the WSM using the identical MAP ID.

And, a first field indicating information on a form of a WSM format according to 9$^{th}$ embodiment can be included in the WSM. Although it is not depicted, the separate first field can be added to the format depicted in FIG. 22 and FIG. 23. Or, the information of the first field can be included in one of the conventional fields. And, the information related to the first field can be delivered via a separate signaling.

Device Configuration

FIG. 24 is a block diagram for indicating a configuration of a device applicable to an STA or an AP and capable of performing the present invention. As depicted in FIG. 24, a device 100 includes a processor 101, a memory 102, an RF (radio frequency) unit 103, a display unit 104, and a user interface unit 105.

A layer of a physical interface protocol is performed by the processor 101. The processor 101 provides a control plane and a user plane. The processor 101 can perform functions of each layer.

The memory 102 is electrically connected to the processor 101 and stores an operating system, an application, and a general file.

If the device 600 corresponds to a user device, the display unit 104 can display various informations and can be implemented using such a well-known component as an LCD (liquid crystal display), an OLED (organic light emitting diode) display and the like. The user interface module 105 can be configured in a manner of being combined with such a well-known user interface as a keypad, a touchscreen and the like.

The RF unit 103 is electrically connected to the processor 101 and transmits or receives a radio signal. The RF unit 103 can include a transmission module and a reception module.

The transmission module may perform prescribed coding and modulation on a signal and/or data, which is scheduled by the processor 101 and will be then transmitted externally, and may be then able to deliver the coded and modulated signal and/or data to an antenna.

The reception module may perform decoding and demodulation on the radio signal received from external via the antenna, restores the signal to an original data form and may be then able to deliver the data to the processor 101.

The reception module according to embodiment of the present invention receives information on a first band and a second band from an AP via the first band currently communicating with the AP.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments of the present invention are described in a manner of mainly concerning IEEE 802.11 system, the embodiments can be applied to various mobile communication systems where an unlicensed device can operate by obtaining available channel information with an identical method.

What is claimed is:

1. A method of performing a communication by a station in a whitespace band, the method comprising:
   transmitting, by the station to a database device, a channel scheduling request frame for querying scheduling information on available channels; and
   receiving, by the station from the database device, a channel scheduling response frame including the scheduling information on the available channels,
   wherein the channel scheduling response frame includes a channel number field,
   wherein, if a channel availability time field is included in the channel scheduling response frame, a value of the channel availability time field indicates a starting time when a channel indicated by the channel number field is available for operation, and
   wherein, if the channel availability time field is not present in the channel scheduling response frame, the station takes a time that the channel scheduling response frame is received as the starting time.

2. The method of claim 1, wherein the whitespace band comprises a TV whitespace band.

3. An station device for performing communication in a whitespace band, the station device comprising:
   a transceiver; and
   a processor configured to:
      transmit, via the transceiver to a database device, a channel scheduling request frame for querying scheduling information on available channels; and
      receive, via the transceiver from the database device, a channel scheduling response frame including the scheduling information on the available channels,
      wherein the channel scheduling response frame includes a channel number field,
      wherein, if a channel availability time field is included in the channel scheduling response frame, a value of the channel availability time field indicates a starting time when a channel indicated by the channel number field is available for operation, and
      wherein, if the channel availability time field is not present in the channel scheduling response frame, the station takes a time that the channel scheduling response frame is received as the starting time.

4. The method of claim 1, wherein the channel scheduling request frame includes at least one channel number field.

5. The method of claim 1, wherein the channel scheduling response frame includes at least one channel number field.

6. The method of claim 1, wherein the channel scheduling response frame further includes a channel availability duration field.

7. The method of claim 1, wherein:
   the channel scheduling response frame further includes at least one set of fields; and
   each set of fields includes a channel number field, a channel availability time field, and a channel availability duration field.

8. The method of claim 1, wherein:
   the channel scheduling response frame further includes at least one set of fields; and
   each set of fields includes a channel number field and a channel availability duration field.

9. The method of claim 1, wherein the channel availability time field indicates the starting time in Coordinated Universal Time (UTC).

10. The method of claim 1, wherein the channel scheduling response frame further includes a device type field.

11. The method of claim 1, wherein the channel number field indicates a channel having a TV channel format or a channel having a base channel unit format.

* * * * *